(12) United States Patent
Cook

(10) Patent No.: US 7,808,447 B1
(45) Date of Patent: Oct. 5, 2010

(54) SYSTEM AND METHOD FOR DRIVING A PLURALITY OF DISPLAYS

(75) Inventor: David Robert Cook, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 972 days.

(21) Appl. No.: 11/538,728

(22) Filed: Oct. 4, 2006

(51) Int. Cl.
*G09G 5/00* (2006.01)

(52) U.S. Cl. .................................. 345/1.3; 345/204

(58) Field of Classification Search ............. 345/1.1–4, 345/6, 204, 87, 76, 82
See application file for complete search history.

(56) References Cited

U.S. PATENT DOCUMENTS

| | | | |
|---|---|---|---|
| 2003/0098820 A1* | 5/2003 | Someya et al. | 345/1.3 |
| 2003/0179155 A1* | 9/2003 | Someya | 345/1.1 |
| 2004/0075621 A1* | 4/2004 | Shiuan et al. | 345/1.1 |
| 2004/0201544 A1* | 10/2004 | Love et al. | 345/1.1 |
| 2005/0057434 A1* | 3/2005 | Youn | 345/1.3 |
| 2006/0055626 A1* | 3/2006 | Tremblay | 345/2.2 |
| 2006/0250321 A1* | 11/2006 | Park et al. | 345/1.3 |

OTHER PUBLICATIONS http://www.matrox.com/graphics/offhome/gxm.cfm Matrox Graphics-Graphics eXpansion Modules, 2006.
https://engwiki/index.php/Game_stereo, 2006.

* cited by examiner

*Primary Examiner*—Stephen G Sherman
(74) *Attorney, Agent, or Firm*—Zilka-Kotab, PC

(57) ABSTRACT

A system, method, and computer program product are provided. In use, a unique monoscopic output is received from a graphics processor. The unique monoscopic output includes a first frame for display utilizing a first display, and a second frame for display utilizing a second display. Thus, a plurality of displays may be driven utilizing the unique monoscopic output.

17 Claims, 5 Drawing Sheets

SYSTEM AND METHOD FOR DRIVING A PLURALITY OF DISPLAYS

FIELD OF THE INVENTION

The present invention relates to multiple-display systems, and more particularly to driving multiple-display systems.

BACKGROUND

Prior art FIG. 1 illustrates a multiple-display system 100, in accordance with the prior art. Included is a plurality of displays 102, 104, 106, 108 each adapted for depicting a unique portion of an image, where multiple images may be sequentially displayed for providing a video viewing experience. As shown, the display 102 depicts upper left-hand display content, the display 104 depicts upper right-hand display content, the display 106 depicts lower left-hand display content, and the display 108 depicts lower right-hand display content.

For driving such displays 102, 104, 106, 108, a plurality of graphics processors 110, 112 (each associated with a corresponding graphics card, etc.) is further included. Traditionally, such graphics processors 110, 112 each include two outputs (e.g. ports, etc.) each adapted for driving a single display. In this way, each graphics processor 110, 112 is only capable of driving two displays 102, 104, 106, 108.

To this end, in the illustrated environment, two of such graphics processors 110, 112 are required to drive four displays 102, 104, 106, 108. While four displays are show in FIG. 1, other systems exist where more displays (e.g. 6, 8, or more, etc.) are utilized. Therefore, as the number of such displays grows beyond two, the cost of driving the same increases as well (e.g. at least one graphics processor must be provided for each pair of displays, etc.).

SUMMARY

A system, method, and computer program product are provided. In use, a unique monoscopic output is received from a graphics processor. The unique monoscopic output includes a first frame for display utilizing a first display, and a second frame for display utilizing a second display. Thus, a plurality of displays may be driven utilizing the unique monoscopic output.

DETAILED DESCRIPTION

Figure 1:
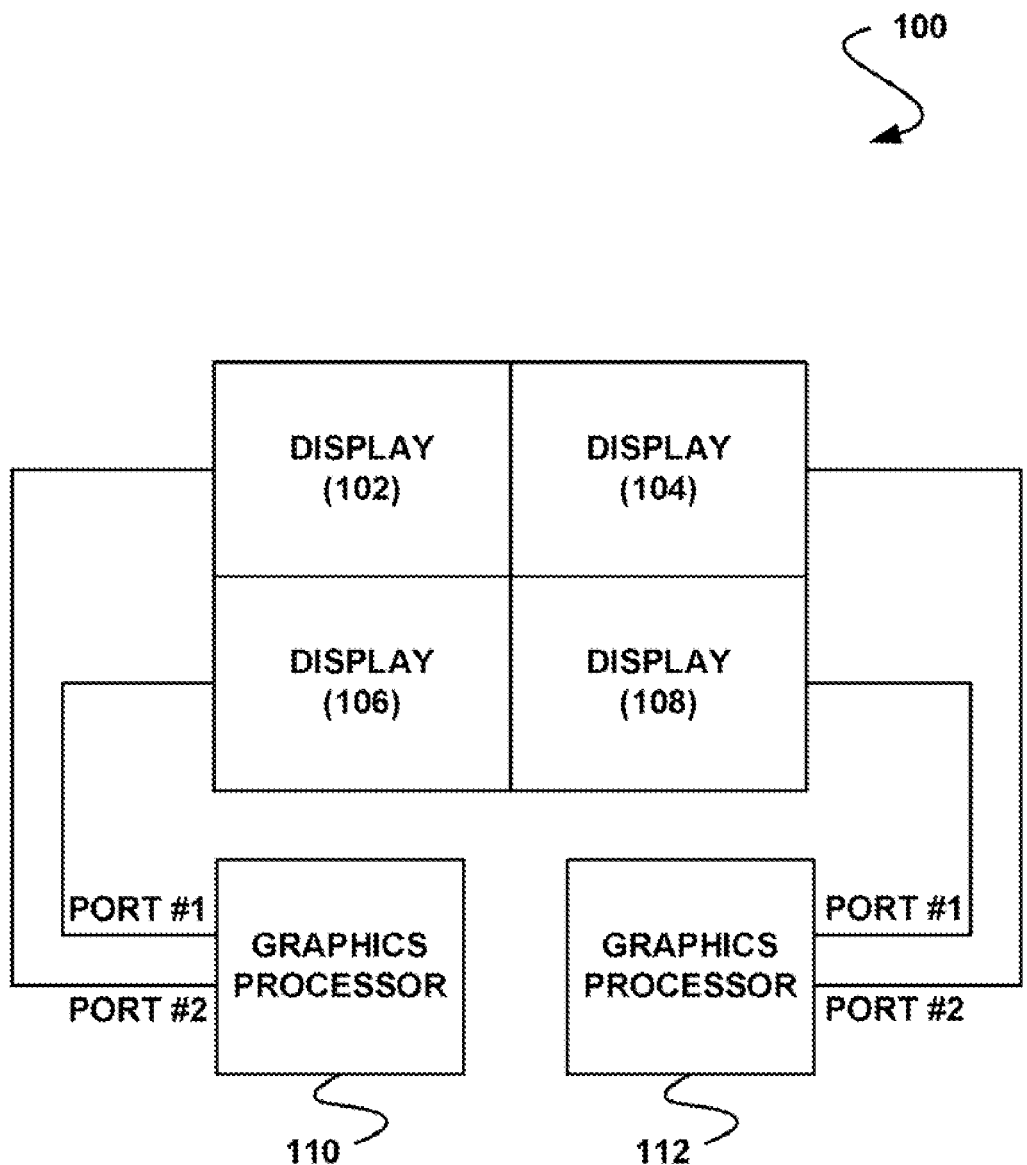
FIG. 1 illustrates a multiple-display system, in accordance with the prior art.
Figure 2:
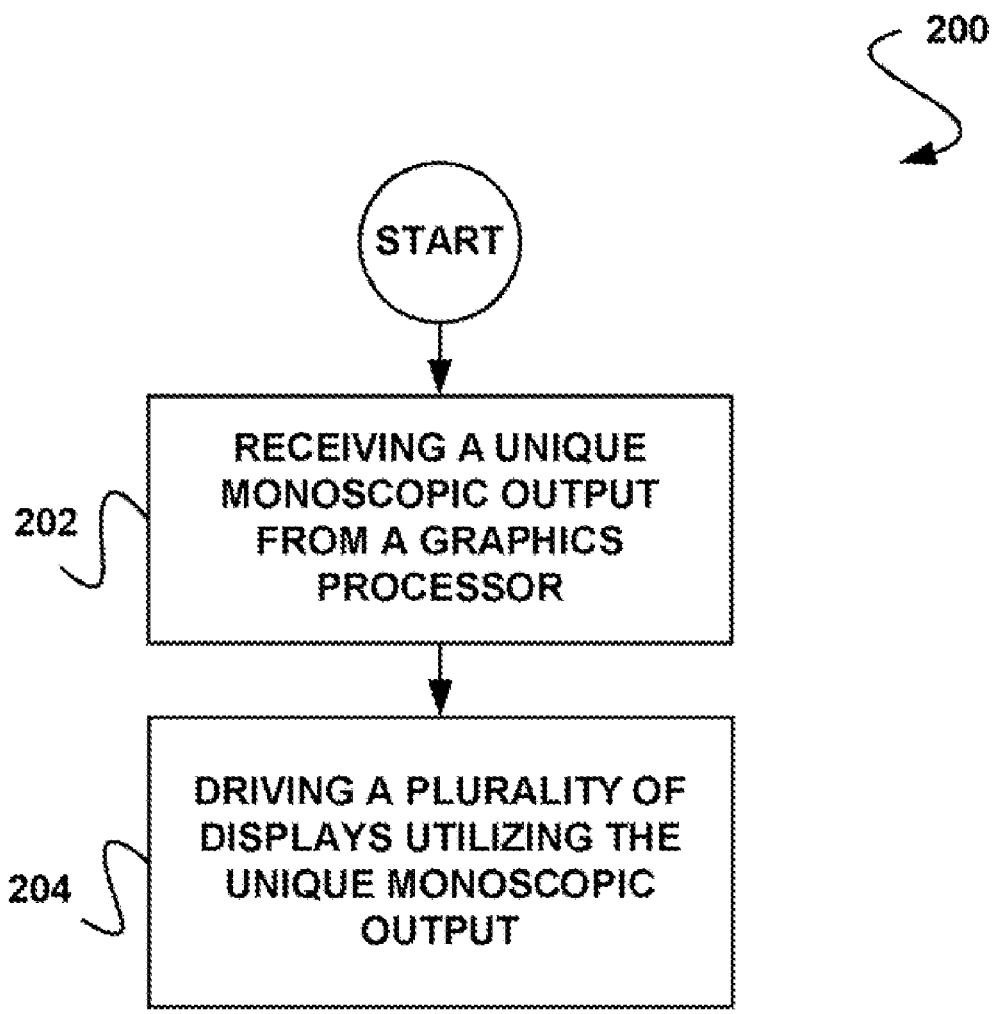
FIG. 2 shows a method for driving a plurality of displays, in accordance with one embodiment.

FIG. 2 shows a method 200 for driving a plurality of displays, in accordance with one embodiment. As shown in operation 202, a unique monoscopic output is received from a graphics processor. In one embodiment, such graphics processor may include a graphics processing unit (GPU), and may further be incorporated on a graphics card. It should be noted, however, that, in the context of the present description, the graphics processor may include any processor capable of processing graphics data.

Also in the context of the present description, the unique monoscopic output may include any unique monoscopic content capable of being output by the graphics processor. For example, in various embodiments, the unique monoscopic output may take the form of a plurality of frames. Further, such frames may each include at least a portion of an image (e.g. still image, portion of a video, etc.). Still yet, such unique monoscopic output may optionally be provided utilizing a single port of the graphics processor.

For example, the unique monoscopic output may include a first frame and a second frame. Of course, it should be noted that the unique monoscopic output may also include additional frames. In use, the first frame may be intended for display utilizing a first display and the second frame may be intended for display utilizing a second display. Accordingly, frames associated with the unique monoscopic output may be intended for display on multiple displays.

In one embodiment, the unique monoscopic output may be monoscopic because the first frame and the second frame may each be intended to be viewed by each eye (i.e. both eyes) of a user. In addition, the unique monoscopic output may be unique because the first frame and the second frame may each depict different display content. For example, the first frame and the second frame may each depict a different portion of an image. To this end, the first frame and the second frame may each depict mutually exclusive display content. Of course, however, the first frame and the second frame may depict any desired unique monoscopic output, in various embodiments.

As shown in operation 204, a plurality of displays are driven utilizing the unique monoscopic output. The displays may each include a liquid crystal display (LCD), digital light processing (DLP) display, liquid crystal on silicon (LCOS) display, plasma display, for example. Of course, however, the displays may include any desired devices capable of displaying the unique monoscopic output.

Furthermore, the plurality of displays may be driven utilizing the unique monoscopic output in any desired manner that results in multiple displays being driven by such output. Thus, in one exemplary embodiment, the unique monoscopic output from a single port of a single graphics processor may be utilized to drive multiple displays. To this end, the unique monoscopic output may be utilized to drive two displays, four displays, and/or any other desired number of displays by way of such graphics processor.

By using such unique monoscopic output to drive multiple displays, a number of graphics processors required to drive a plurality of displays may be reduced. In turn, a cost of driving such displays may be decreased.

More illustrative information will now be set forth regarding various optional architectures and features of different embodiments with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3:
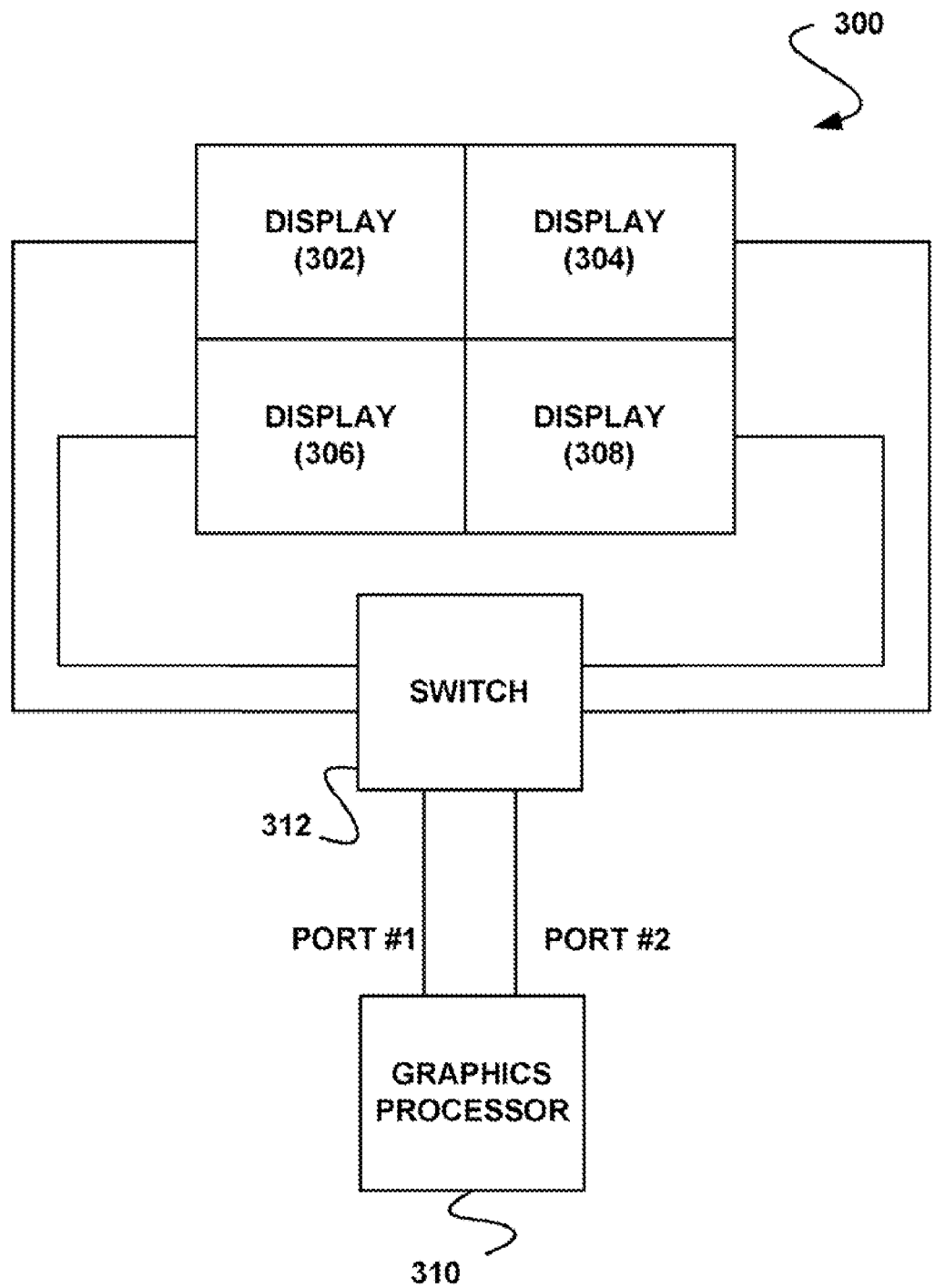
FIG. 3 shows a multiple-display system driven by a single graphics processor, in accordance with another embodiment.

FIG. 3 shows a multiple-display system 300 driven by a single graphics processor, in accordance with another embodiment. As an option, the present system 300 may be implemented to carry out the method 200 of FIG. 2. Of course, however, the system 300 may be implemented in any desired environment. It should also be noted that the previous definitions apply in the context of the description of the present figure.

As shown, a plurality of displays 302, 304, 306, 308 may be driven utilizing unique monoscopic output from a graphics processor 310. As described above with respect to FIG. 2, the unique monoscopic output may include a plurality of frames. Thus, the graphics processor 310 may transmit such frames to the plurality of displays 302, 304, 306, 308.

Specifically, the graphics processor 310 may transmit the unique monoscopic output by way of at least one port associated with the graphics processor 310. As shown, the graphics processor 310 may be equipped with two ports. Of course, however, the graphics processor 310 may be equipped with any desired number of ports.

As also shown, the plurality of displays 302, 304, 306, 308 may be driven utilizing a switch 312. The switch 312 may include any hardware capable of switching a connection from the graphics processor 310 to one of the plurality of displays 302, 304, 306, 308. This connection may be provided in any desired manner. For example, the switch 312 may remain in communication with the graphics processor 310 and the displays 302, 304, 306, 308 via a bus, or a more direct connection may be employed (e.g. without interaction with a bus, etc.), etc.

Further, the switch 312 may be positioned in any desired location. For example, in one embodiment, the switch 312 may be incorporated in the graphics processor 310 or a card associated therewith. In other embodiments, the switch 312 or the functionality thereof may be distributed/incorporated into the displays 302, 304, 306, 308. Even still, the switch 312 may also take the form of a stand alone unit.

In use, the switch 312 may be triggered utilizing a vertical synchronization signal (VSYNC). For example, the switch 312 may be triggered upon a specific vertical banking interval. In this way, the switch 312 may be utilized to transmit each frame to its associated display 302, 304, 306, 308 as a function of such signal. Of course, however, it should be noted that the switch 312 may direct frames to the displays 302, 304, 306, 308 based on any desired trigger.

For example, in one embodiment, the switch 312 may direct a first frame from a first port to the first display 302 in response to as first VSYNC signal, and may direct a second frame from the first port to the second display 306 in response to a second VSYNC signal. In concert with such operation, the switch 312 may also direct a first frame from a second port to the third display 304 in response to the first VSYNC signal, and may further direct a second frame from the second port to the fourth display 308 in response to the second VSYNC signal.

Thus, the frames may be time sequentially transmitted to the displays 302, 304, 306, 308 utilizing the switch 312. One particular example of such time sequence will be described in further detail below with respect to FIG. 4.

Figure 4:
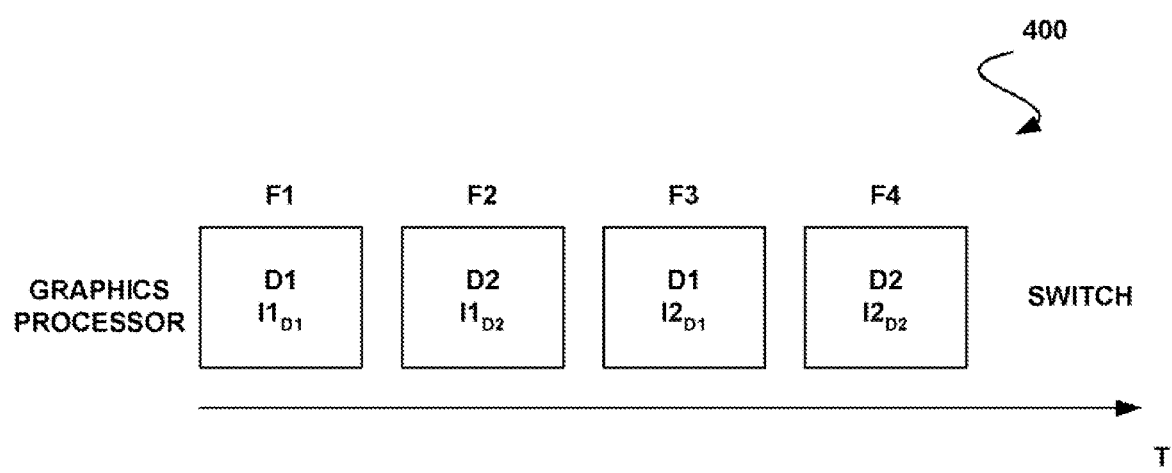
FIG. 4 shows the time sequential display of frames, in accordance with yet another embodiment.

FIG. 4 shows a system 400 for the time sequential display of frames, in accordance with yet another embodiment. As an option, the system 400 may be implemented in the context of the architecture and environment of FIGS. 2 and/or 3. Of course, however, the system 400 may be carried out in any desired environment. It should also be noted that the previous definitions apply in the context of the description of the present figure.

As shown, a graphics processor (e.g. see the graphics processor 310 of FIG. 3, etc.) outputs frames (F1, F2, F3, F4) associated with unique monoscopic output to a plurality of displays (e.g. see displays 302, 304, 306, 308 of FIG. 3, etc.) by way of a switch (e.g. see switch 312 of FIG. 3, etc.). In particular, the frames are output through the switch in a time (T) sequential manner. In this way, the switch may direct the frames to their appropriate displays in sequence.

As shown, the frames are output in sequence. Specifically, the first frame F1 is outputted from the graphics processor after which the second frame F2 is outputted, and so forth. In addition, a rate at which the frame are received by the switch from the graphics processor may be a function of a number of displays driven utilizing the unique monoscopic output. Just by way of example, if four displays are utilized for displaying the unique monoscopic output, the rate at which the frames are received from the graphics processor may be four times a rate in which the frames are updated on each display. To this end, in one embodiment, more displays may be driven based on a performance capability of the graphics processor.

Table 1 shows one exemplary embodiment of calculating a rate at which the frames are received from the graphics processor. Of course, it should be noted that such embodiment is set forth by way of example only, and should not be construed as limiting in any manner.

TABLE 1

1. In system that is capable of displaying content at a rate of 30 hertz and utilizes four (4) panel displays;
2. frames are received from the graphics processor at a time sequential rate of 120 hertz (i.e. 4 * 30 hertz).

As illustrated, each frame may be associated with only one display (D1, D2). Further, each frame may also be associated with a specific portion of an image ($I1_{D1}$, $I1_{D2}$, $I2_{D2}$, $I2_{D2}$). Thus, as shown, the first frame F1 may include a first portion of a first image $I1_{D1}$ for display by the first display D1, the second frame F2 may include a second portion of the first image $I1_{D2}$ for display by the second display D2, and so forth.

To this end, when the first frame F1 is received by the switch, the switch may direct the first frame F1 to the first display D1, such that the first display D1 may display the first portion of the first image $I1_{D1}$. After and while the first display D1 is displaying such content, the second frame F2 is received by the switch and the switch directs the second frame F2 to the second display D2, such that the second display D2 may simultaneously display the second portion of the first image $I1_{D2}$. This process may then be repeated for the second image by overwriting the first display D1 with the first portion of the second image $I2_{D1}$, and so forth.

As a result, frames may be time sequentially transmitted to and displayed on two displays utilizing a single port of a single graphics processor. As mentioned earlier, in an embodiment where the graphics processor includes two ports, four displays may be driven by the single graphics processor in such time sequential manner.

Table 2 illustrates one example of a four frame time sequential display sequence. It should be noted that such example is set forth just by way of illustration only, and should not be construed as limiting in any manner.

Table 2

| FRAME | PORT | OUTPUT |
| --- | --- | --- |
| 1 | 1 | Display 1 view frame 1 |
| 2 | 2 | Display 2 view frame 1 |
| 3 | 1 | Display 3 view frame 1 |
| 4 | 2 | Display 4 view frame 1 |
| 5 | 1 | Display 1 view frame 2 |
| 6 | 2 | Display 2 view frame 2 |
| 7 | 1 | Display 3 view frame 2 |

Table 2-continued

| FRAME | PORT | OUTPUT |
| --- | --- | --- |
| 8 | 2 | Display 4 view frame 2 |
| 9 | 1 | Display 1 view frame 3 |

Figure 5:
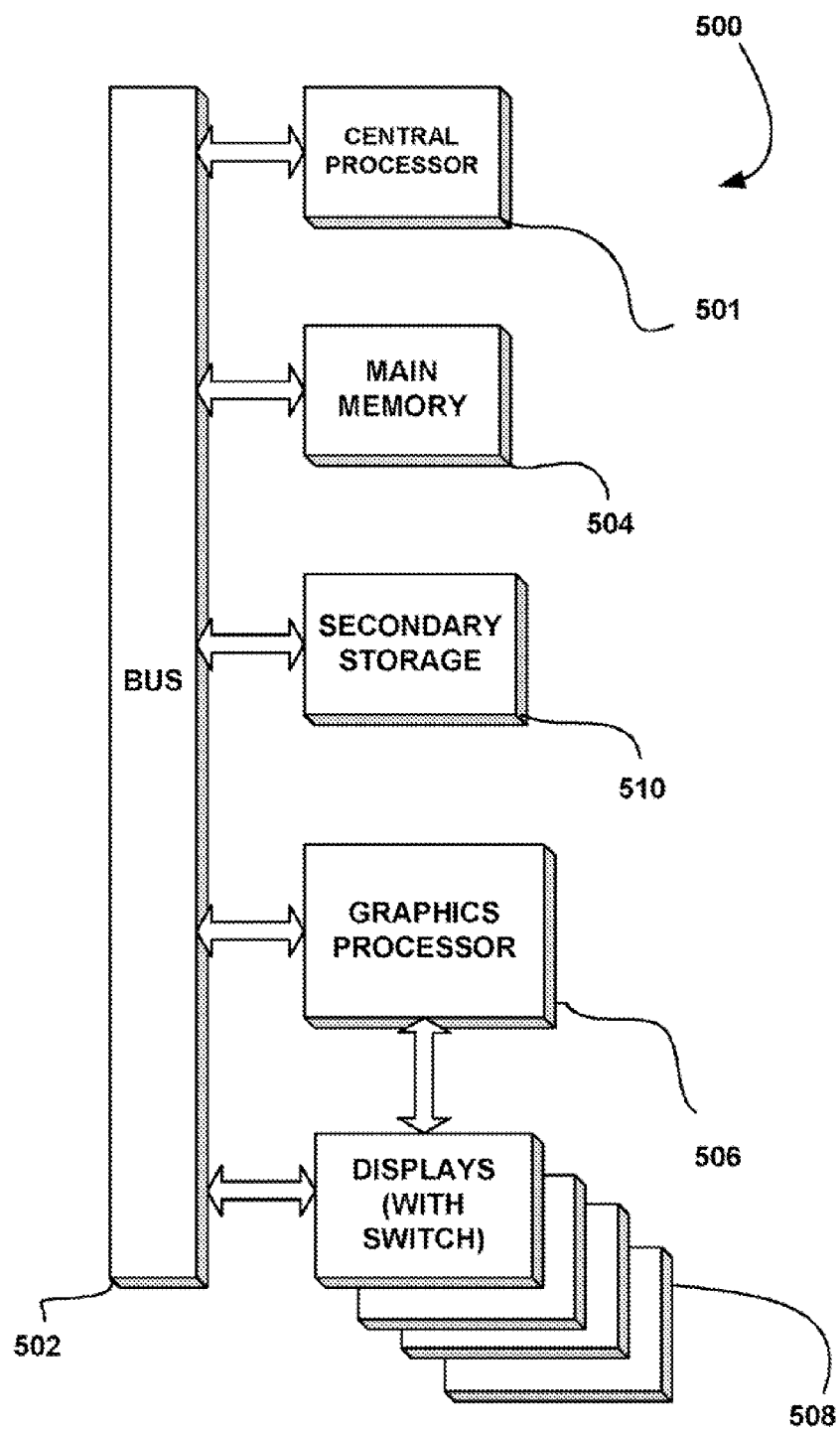
FIG. 5 illustrates an exemplary computer system in which the various architecture and/or functionality of the various previous embodiments may be implemented.

FIG. 5 illustrates an exemplary computer system 500 in which the various architecture and/or functionality of the various previous embodiments may be implemented. As shown, a computer system 500 is provided including one or more host processors 501 which are connected to a communication bus 502. The computer system 500 also includes a main memory 504. Control logic (software) and data are stored in the main memory 504 which may take the form of random access memory (RAM).

The computer system 500 also includes a graphics processor 506 and a plurality of displays 508. In one embodiment, the graphics processor 506 may include a transform module, a lighting module, a rasterization module, a video processing module, etc. Each of the foregoing modules may even be situated on a single semiconductor platform to form a GPU.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional CPU and bus implementation. Of course, the various modules may also he situated separately or in various combinations of semiconductor platforms per the desires of the user.

As mentioned earlier, such displays 508 may each include any device capable of displaying the aforementioned unique monoscopic output. While not shown, in one optional embodiment, two sets of displays may each he associated with a particular eye of a user. For example, the displays may be included within a head-mounted display (HMD). In particular, multiple micro-panel displays may be built into the HMD. As another option, the displays may be built into a flight simulator, a multi-panel display for presentations, etc. Of course, additional optional applications are further contemplated.

Moreover, the plurality of displays 508 may be associated with a switch (not shown). In use, such switch may be used to drive the plurality of displays in the manner set forth earlier during the description of previous figures. To this end, the multiple displays 508 may be driven by a unique monoscopic output.

The computer system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504 and/or the secondary storage 510. Such computer programs, when executed, enable the computer system 500 to perform various functions. Memory 504, storage 510 and/or any other storage are possible examples of computer-readable media.

In one embodiment, the architecture and/or functionality of the various previous figures may be implemented in the context of the host processor(s) 501, graphics processor 506, a chipset (i.e. a group of integrated circuits designed to work and sold as a unit for performing related functions, etc.), and/or any other integrated circuit for that matter.

Still yet, the architecture and/or functionality of the various previous figures may he implemented in the context of a general computer system, a circuit board system, a game console system dedicated for entertainment purposes, an application-specific system, and/or any other desired system.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should he defined only in accordance with the following claims and their equivalents.

What is claimed is:

1. A method, comprising:
   receiving a unique monoscopic output from a graphics processor; and
   driving a plurality of displays utilizing the unique monoscopic output;
   wherein the unique monoscopic output includes a first frame for display utilizing a first display, and a second frame for display utilizing a second display;
   wherein a switch directs the first frame to the first display in response to a first vertical synchronization signal, and directs the second frame to the second display in response to a second vertical synchronization signal;
   wherein the switch is coupled to at least two ports of the graphics processor, a first port of the graphics processor drives the first display and the second display, and a second port of the graphics processor drives a third display and a fourth display;
   wherein the switch directs the first frame from the first port of the graphics processor to the first display in response to the first vertical synchronization signal, the switch directs the second frame from the first port of the graphics processor to the second display in response to the second vertical synchronization signal, the switch directs a first frame from the second port of the graphics processor to the third display in response to the first vertical synchronization signal, and the switch directs a second frame from the second port of the graphics processor to the fourth display in response to the second vertical synchronization signal.

2. The method as recited in claim 1, wherein the second frame from the first port is output from the graphics processor after the first frame from the first port.

3. The method as recited in claim 2, wherein the second frame from the first port is output from the graphics processor after the first frame from the first port, but before any additional frame.

4. The method as recited in claim 2, wherein the second flame from the first port is displayed utilizing the second display simultaneously with the display of the first frame from the first port utilizing the first display.

5. The method as recited in claim 1, wherein the first frame from the first port is for display utilizing only the first display, and the second frame from the first port is for display utilizing only the second display.

6. The method as recited in claim 1, wherein the plurality of displays are driven utilizing the switch.

7. The method as recited in claim 1, wherein the unique monoscopic output is utilized to drive only four displays.

8. The method as recited in claim 1, wherein the unique monoscopic output is utilized to drive more than four displays.

9. The method as recited in claim 1, wherein a rate at which the frames are received from the graphics processor is a function of a number of displays driven utilizing the unique monoscopic output.

10. The method as recited in claim 1, wherein the unique monoscopic output is unique because the frames each depict different display content.

11. The method as recited in claim 1, wherein the frames each depict mutually exclusive display content.

12. The method as recited in claim 1, wherein the unique monoscopic output is monoscopic because the frames are each intended to be viewed by each eye of a user.

13. The method as recited in claim 1, wherein the frames together display at least a portion of a single image.

14. The method as recited in claim 1, wherein each of the displays includes a liquid crystal display.

15. A computer program product embodied on a non-transitory computer readable medium, comprising:
    computer code for driving a plurality of displays utilizing unique monoscopic output received from a graphics processor;
    wherein the unique monoscopic output includes a first frame for display utilizing a first display, and a second frame for display utilizing a second display;
    wherein the computer program product is operable such that the first frame is directed to the first display in response to a first vertical synchronization signal, and the second frame is directed to the second display in response to a second vertical synchronization signal;
    wherein a first port of the graphics processor drives the first display and the second display, and a second port of the graphics processor drives a third display and a fourth display;
    wherein the computer program product is operable such that the first frame is directed from the first port of the graphics processor to the first display in response to the first vertical synchronization signal, the second frame is directed from the first port of the graphics processor to the second display in response to the second vertical synchronization signal, a first frame is directed from the second port of the graphics processor to the third display in response to the first vertical synchronization signal, and a second frame is directed from the second port of the graphics processor to the fourth display in response to the second vertical synchronization signal.

16. A system, comprising
    hardware for receiving a unique monoscopic output from a graphics processor, and driving a plurality of displays utilizing the unique monoscopic output;
    wherein the unique monoscopic output includes a first frame for display utilizing a first display, and a second frame for display utilizing a second display;
    wherein the hardware directs the first frame to the first display in response to a first vertical synchronization signal, and directs the second frame to the second display in response to a second vertical synchronization signal;
    wherein the hardware is coupled to at least two ports of the graphics processor, a first port of the graphics processor drives the first display and the second display, and a second port of the graphics processor drives a third display and a fourth display;
    wherein the hardware directs the first frame from the first port of the graphics processor to the first display in response to the first vertical synchronization signal, the hardware directs the second frame from the first port of the graphics processor to the second display in response to the second vertical synchronization signal, the hardware directs a first frame from the second port of the graphics processor to the third display in response to the first vertical synchronization signal, and the hardware directs a second frame from the second port of the graphics processor to the fourth display in response to the second vertical synchronization signal.

17. The system as recited in claim 16, wherein the hardware is in communication with the graphics processor which is in communication with a central processing unit via a bus.

* * * * *

UNITED STATES PATENT AND TRADEMARK OFFICE
CERTIFICATE OF CORRECTION

PATENT NO.         : 7,808,447 B1                                    Page 1 of 1
APPLICATION NO.    : 11/538728
DATED              : October 5, 2010
INVENTOR(S)        : David R. Cook It is certified that error appears in the above-identified patent and that said Letters Patent is hereby corrected as shown below:

Col. 3, line 20, please replace "he" with --be--;
Col. 3, line 28, please replace "he" with --be--;
Col. 3, line 43, please replace "as" with --a--;
Col. 4, line 24, please replace "In system" with --In a system--;
Col. 5, line 31, please replace "he" with --be--;
Col. 5, line 36, please replace "he" with --be--;
Col. 6, line 4, please replace "he" with --be--;
Col. 6, line 14, please replace "he" with --be--.
Col. 6, line 56, please replace "flame" with --frame--.

Signed and Sealed this
Seventh Day of June, 2011

David J. Kappos
*Director of the United States Patent and Trademark Office*